United States Patent
Drescher

(10) Patent No.: US 9,720,873 B2
(45) Date of Patent: Aug. 1, 2017

(54) METHOD FOR A DETERMINISTIC SELECTION OF A SENSOR FROM A PLURALITY OF SENSORS

(71) Applicant: Micronas GmbH, Freiburg (DE)

(72) Inventor: Michael Drescher, Freigburg (DE)

(73) Assignee: TDK-Micronas GmbH, Freiburg (DE)

( * ) Notice: Subject to any disclaimer, the term of this patent is extended or adjusted under 35 U.S.C. 154(b) by 182 days.

(21) Appl. No.: 14/872,762

(22) Filed: Oct. 1, 2015

(65) Prior Publication Data

US 2016/0098374 A1  Apr. 7, 2016

(30) Foreign Application Priority Data

Oct. 2, 2014  (DE) .................. 10 2014 014 379

(51) Int. Cl.
  *G06F 13/362*  (2006.01)
  *G06F 13/42*  (2006.01)
  *H04L 12/403*  (2006.01)
  *G06F 1/32*  (2006.01)

(52) U.S. Cl.
  CPC .......... *G06F 13/426* (2013.01); *G06F 1/3296* (2013.01); *H04L 12/403* (2013.01)

(58) Field of Classification Search
  None
  See application file for complete search history.

(56) References Cited

U.S. PATENT DOCUMENTS

| 8,183,982 | B2 | 5/2012 | Scherr |
| 8,519,819 | B2 | 8/2013 | Scherr |
| 8,577,634 | B2 | 11/2013 | Donovan et al. |
| 8,948,280 | B2 | 2/2015 | Hammerschmidt et al. |
| 2015/0058507 | A1* | 2/2015 | Sengoku ............ G06F 13/4226 710/110 |
| 2015/0270994 | A1* | 9/2015 | Scherr ................ H04L 25/4902 375/238 |

(Continued)

FOREIGN PATENT DOCUMENTS

| DE | 10 2008 031 498 A1 | 1/2010 |
| DE | 10 2013 006 378 A1 | 10/2014 |

OTHER PUBLICATIONS

Beaurenaut et al., Infineon Technologies, "Short PWM Code: A Step Towards Smarter Automotive Sensors," Advanced Microsystems for Automotive Applications 2009: Smart Systems for Safety, Sustainability and Comfort, Berlin, pp. 383-395 (2009).

(Continued)

*Primary Examiner* — Ilwoo Park
(74) *Attorney, Agent, or Firm* — Muncy, Geissler, Olds & Lowe, P.C.

(57) ABSTRACT

A method for a deterministic selection of a sensor from a plurality of sensors, having a control unit and multiple sensors connected to the control unit by means of a three-wire bus, wherein the sensors are connected to the three-wire bus through at least two lines in parallel to one another, and a protocol frame in conformity with the SENT specification is used between the control unit and the sensors for a data exchange, and a particular sensor is selected within the protocol frame by the control unit through the predefined duration of a selection signal, wherein the duration of the selection signal is determined by the interval between a first falling signal edge and a second falling signal edge.

8 Claims, 1 Drawing Sheet

(56) References Cited

U.S. PATENT DOCUMENTS

2016/0050089 A1* 2/2016 Strasser .................. H04L 67/10
                                                                                375/238

OTHER PUBLICATIONS

Infineon, "TLE4998C3, TLE4998C4 Programmable Linear Hall Sensor", Data Sheet, Rev 1.0, pp. 1-44 (Dec. 2008).
Josef Kramolis, "Freescale Semiconductor Application Note: SENT/SPC Driver for the MPC5510 Microcontroller Family," Doc. No. ANA4219, pp. 1-29 (Oct. 2010).

* cited by examiner

METHOD FOR A DETERMINISTIC SELECTION OF A SENSOR FROM A PLURALITY OF SENSORS

This nonprovisional application claims priority to German Patent Application No. 10 2014 014 379.1, filed on Oct. 2, 2014, which is herein incorporated by reference.

BACKGROUND OF THE INVENTION

Field of the Invention

The invention relates to a method for a deterministic selection of a sensor from a plurality of sensors.

Description of the Background Art

A method for a deterministic selection of a sensor from a plurality of sensors is known from U.S. Pat. No. 8,519,819. Here, multiple sensors are connected in parallel to one another on a three-wire bus and connected to a control unit. The control unit communicates with the sensors in conformity with a so-called SENT, or "Single Edge Nibble Transmission," protocol. In order to exchange data with an individual sensor, a deterministic selection is first carried out by the control unit with the sensors. To this end, the time duration of a pulse, which is to say the length of time between a falling edge and a rising edge that directly follows it, is varied by the control unit.

In addition, sensors connected to a control unit using the three-wire bus are known from U.S. Pat. No. 8,183,982 and U.S. Pat. No. 8,577,634.

SUMMARY OF THE INVENTION

It is therefore an object of the invention to provide a method that advances the state of the art.

According to an embodiment of the invention, a method for a deterministic selection of a sensor from a plurality of sensors is provided, having a control unit and multiple sensors connected to the control unit via a three-wire bus, wherein the sensors are connected in parallel to one another to at least two lines of the three-wire bus, and a protocol frame in conformity with the SENT specification is used between the control unit and the sensors for a data exchange, and a particular sensor is selected within the protocol frame by the control unit through the predefined duration of a selection signal, wherein the duration of the selection signal is determined by the interval between a first falling signal edge and a second falling signal edge.

Sensors can be ICs with an integrated sensor, wherein the sensors can be implemented as Hall effect sensors. In addition, a level of the selection signal can take on a first value and a second value, wherein the first, low value can be implemented as the "low" level, and the second, higher value can be implemented as the "high" level.

An advantage of the method according to the invention is that a very reliable selection of an individual sensor takes place in a simple manner. In addition, each of the sensors can be addressed very quickly, and in this way accelerate the data transmission between the control unit and the sensors.

In an embodiment, just a single high signal level state can be formed between the first signal edge and the second signal edge. In other words, after the first falling signal edge, the signal level rises from the first, low value to the second, higher value, and only subsequently drops back to the first, low value at the second falling signal edge.

In another improvement, a pause signal can be sent by the selected sensor after the selection signal. Here, the pause signal includes the second falling edge of the selection signal and an additional falling signal edge. The time interval between the first falling edge of the selection signal and the end of the pause signal is preferably constant. In another improvement, a pause signal is likewise sent by the control unit.

In an embodiment, a unique duration can be assigned to each sensor, with the time interval between two different durations being at least four microseconds. In other words, if the duration of the selection signal for the first sensor is thirty-two microseconds, then the duration of the selection signal for the second sensor is at least thirty-six microseconds.

In an embodiment, the duration of the pulses of the selection signal between the falling edge and the subsequent rising edge can be predefined by the control unit as greater than the duration predefined by the sensor of the pulses between the falling edge and the subsequent rising edge. In other words, the selection signal has a first pulse and a second pulse, wherein the falling edge of the first pulse marks the start of the duration of the selection signal, and the falling edge of the second pulse marks the end of the duration of the selection signal.

Alternatively, the sensors that are not selected can monitor the message, and once the current message is terminated, then detect another selection signal.

In an exemplary embodiment, at least twelve microseconds can be chosen as the shortest duration for the selection signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
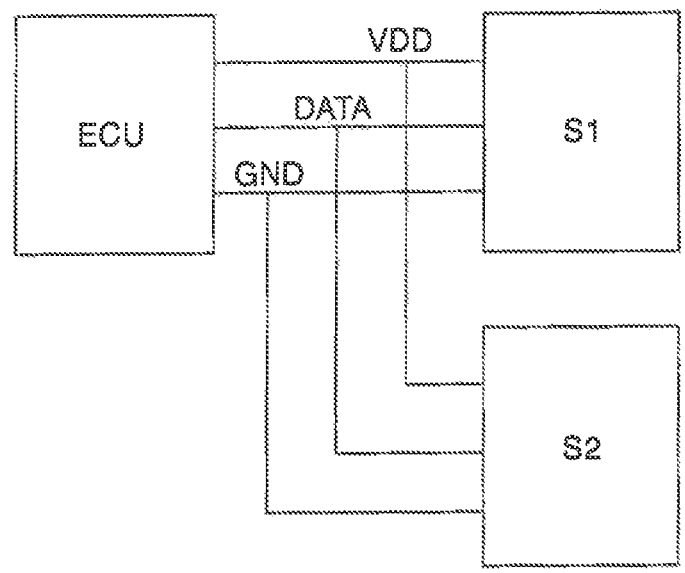
FIG. 1 shows a view of a first circuit configuration for carrying out the method according to the invention.

The illustration in FIG. 1 shows a view of a first circuit configuration for carrying out the method according to the invention. A control unit ECU is connected by means of a supply voltage line VDD and a data line DATA and a ground line GND to a first sensor S1 and a second sensor S2. The aforementioned three lines VDD, DATA, GND form a three-wire bus. The two sensors S1 and S2 are connected to the bus in parallel with one another.

Figure 2:
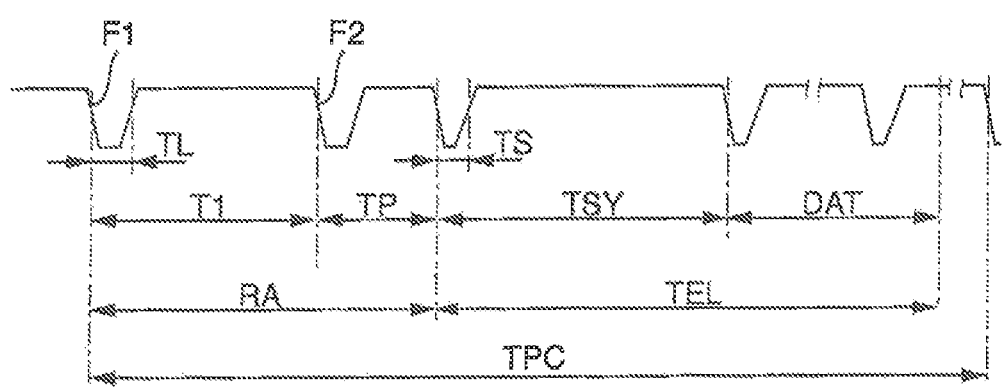
FIG. 2 shows a view of a protocol frame.

A view of a protocol frame TPC is shown in the illustration in FIG. 2. The protocol frame TPC has a first part RA and a second part TEL. In the first part RA, a request signal is placed on the bus by the control unit ECU. In the second part TEL of the protocol frame TPC, the selected sensor S1 or S2 transmits to the control unit ECU a synchronization signal TSY and the sensor data within a section DAT. The first part RA comprises a selection signal with a duration T1 and a pause signal with a length TP. The duration T1 of the selection signal is determined by the interval between a first falling signal edge F1 and a second falling signal edge F2. Either the sensor S1 or the sensor S2 is selected by means of the duration T1, which is a different length for each of the connected sensors S1 and S2. It is a matter of course that a sensor-specific time length of the selection signal has been communicated to the sensors S1 and S2 beforehand.

By means of the control unit ECU, the duration of the pulses TL of the selection signal is set longer than the duration of the pulses TS predetermined by the sensors, wherein each pulse always has a falling edge and a rising edge directly following it. In other words, the selection signal has a first pulse TL and a second pulse TL, wherein the falling edge F1 of the first pulse TL marks the start of the duration T1 of the selection signal, and the falling edge F2 of the second pulse TL marks the end of the duration T1 of the selection signal.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for a deterministic selection of a sensor from a plurality of sensors having a control unit and multiple sensors connected to the control unit by a three-wire bus, the method comprising:
    connecting the sensors in parallel to one another to at least two lines of the three-wire bus and a protocol frame in conformity with a SENT specification is used between the control unit and the sensors for a data exchange;
    selecting a particular sensor within the protocol frame by the control unit through the predefined duration of a selection signal; and
    determining a duration of the selection signal by an interval between a first falling signal edge and a second falling signal edge.

2. The method for a deterministic selection of a sensor from a plurality of sensors according to claim 1, wherein just a single high signal level state is formed between the first signal edge and the second signal edge.

3. The method for a deterministic selection of a sensor from a plurality of sensors according to claim 1, wherein a pause signal is sent by the control unit or by the sensors after the selection signal.

4. The method for a deterministic selection of a sensor from a plurality of sensors according to claim 3, wherein the selection signal and the pause signal are transmitted as part of a request signal by the control unit.

5. The method for a deterministic selection of a sensor from a plurality of sensors according to claim 4, wherein at least eight microseconds is chosen as a shortest duration.

6. The method for a deterministic selection of a sensor from a plurality of sensors according to claim 1, wherein a unique duration is assigned to each sensor, and wherein the time interval between two durations is at least four microseconds.

7. The method for a deterministic selection of a sensor from a plurality of sensors according to claim 1, wherein each sensor is driven with its own supply voltage line.

8. The method for a deterministic selection of a sensor from a plurality of sensors according to claim 1, wherein the duration of pulses of the selection signal between the falling edge and a subsequent rising edge is predefined by the control unit as greater than a duration of the pulses predefined by the sensor.

* * * * *